United States Patent
Juliano (10) Patent No.: US 7,830,541 B2
(45) Date of Patent: Nov. 9, 2010

(54) METHOD AND SYSTEM FOR PROVIDING SECURE FACSIMILE TRANSMISSION CONFIRMATION

(75) Inventor: Cornell Juliano, Churchville, NY (US)

(73) Assignee: Xerox Corporation, Norwalk, CT (US)

( * ) Notice: Subject to any disclaimer, the term of this patent is extended or adjusted under 35 U.S.C. 154(b) by 1027 days.

(21) Appl. No.: 11/601,480

(22) Filed: Nov. 17, 2006

(65) Prior Publication Data

US 2008/0117473 A1    May 22, 2008

(51) Int. Cl.
    *G06F 3/12*        (2006.01)
(52) U.S. Cl. .................. 358/1.15; 358/402; 358/440; 358/434; 379/100.08; 379/206
(58) Field of Classification Search .............. 358/1.15, 358/402, 400, 403, 405, 434, 404, 448; 379/100.08, 379/206, 203, 217
    See application file for complete search history.

(56) References Cited

U.S. PATENT DOCUMENTS

| | | | |
|---|---|---|---|
| 5,283,665 A | 2/1994 | Ogata | |
| 6,188,766 B1 | 2/2001 | Kocher | |
| 6,446,115 B2 * | 9/2002 | Powers | 709/206 |
| 6,710,897 B1 * | 3/2004 | Shimoyama | 358/440 |
| 7,054,039 B2 | 5/2006 | Burke | |
| 7,079,271 B2 * | 7/2006 | Suzuki | 358/1.15 |
| 7,108,436 B2 * | 9/2006 | Sawano | 400/76 |
| 7,314,259 B2 * | 1/2008 | Fujinaga | 347/2 |
| 7,672,003 B2 * | 3/2010 | Dowling et al. | 358/1.15 |
| 7,755,790 B2 * | 7/2010 | Henry et al. | 358/1.15 |
| 2003/0020959 A1 * | 1/2003 | Henry | 358/402 |
| 2004/0085571 A1 * | 5/2004 | Hulan et al. | 358/1.15 |
| 2004/0158733 A1 * | 8/2004 | Bouchard | 713/200 |
| 2006/0072144 A1 * | 4/2006 | Dowling et al. | 358/1.15 |
| 2007/0236750 A1 * | 10/2007 | Henry et al. | 358/402 |

OTHER PUBLICATIONS

U.S. Appl. No. 11/482,895, filed Jul. 10, 2006, Louis Ba La.

* cited by examiner

*Primary Examiner*—Negussie Worku
(74) *Attorney, Agent, or Firm*—Tuesday A. Kaasch; Kermit D. Lopez; Luis M. Ortiz (57) ABSTRACT

A method for providing a secure fax confirmation page from a facsimile capable device having a user interface includes receiving documents, in the form of a fax job, to be transmitted by the facsimile capable device. After receipt of a recipient's fax number, a determination is made as to whether secure fax confirmation has been selected from the user interface. A passcode is received prior to scanning of the documents. The interface displays a fax job list, which identifies whether a secure fax confirmation page is associated with individual fax jobs. Upon selection of a confirmation page by the operator, the facsimile capable device prints a secure fax confirmation page.

20 Claims, 7 Drawing Sheets

METHOD AND SYSTEM FOR PROVIDING SECURE FACSIMILE TRANSMISSION CONFIRMATION

BACKGROUND AND SUMMARY

This disclosure relates generally to the secure automated exchange, management, and processing of documents, and more particularly to a system and method for providing a secure, hard copy, facsimile confirmation page.

In many networked environments, a potentially large number of users or clients must share resources including input/output devices such as the network's printer(s), facsimile devices, and fax capable printers. Conventionally, a fax capable printer prints out a fax transmission confirmation page upon the successful or unsuccessful transmission of the fax job. Even though printing a fax transmission report page provides adequate feedback to a user, it is often inefficient and inconvenient. Depending upon network/telephone traffic, the number of attempts that are made by the machine to fax, and other parameters that the operator does not control, the confirmation page may be printed out long after the operator has left the device. Thus the sender may not be present when the confirmation page is finally printed. In addition, printing a fax transmission report page can result in several management issues, including the issue of confidentiality. The fax transmission confirmation page typically consists of various kinds of information about the faxed job, including a reduced sample image of the first page of the faxed document. The sample image on the confirmation page may contain private or confidential information that the user would prefer not to be available to others who use the machine.

For example, some employee benefit service providers, like flexible medical spending account managers, require employees to fax paperwork to them without a cover sheet. If a fax transmission report page prints the first page of a flexible spending account form, it can expose highly confidential information such as an employee's social security number, full name, home address, date of birth, and signed signature, which could be used to commit identity theft.

To address this problem, it would be useful to have a fax security feature that permits a user to instruct a fax capable device to store the confirmation page until the user releases it with a passcode and an instruction to print the confirmation page. Such functionality could be provided through a graphical user interface or a combination of a user interface and a display.

All U.S. patents and published U.S. patent applications cited herein are fully incorporated by reference. The following patents or publications are noted.

U.S. Pat. No. 5,283,665 to Ogata ("Facsimile Apparatus") describes a facsimile apparatus connected to an ISDN and having a confirmation function by which an addressor is capable of confirming whether data transmitted by the addressor have reached the addressee with certainty. The apparatus on the transmitting side adds transmission management information to the transmission data and sends both the data and the additional information to an apparatus on the receiving side. Based on the received transmission management information, the apparatus on the receiving side responds by sending information indicating that it has assuredly received the data back to the apparatus on the transmitting side. Thus, transmission of the data is performed with assurance by exchange of management information between the apparatus on the transmitting and receiving sides. Also disclosed is a facsimile apparatus having a function in which a password on the receiving side is provided so that a specific individual can confirm certain receipt of data.

U.S. Pat. No. 6,188,766 to Kocher ("Apparatus and Method for Confirming, Timestamping, and Archiving Printer and Telecopier Transmissions") describes an apparatus and method for confirming, timestamping, and archiving documents using telecopiers (e.g., facsimile machines). User sends a document to a timestamping service via facsimile, which archives the transmission with a timestamp. A submission receipt, containing size-reduced images of the submission and a document identification value (DIV), is prepared and sent to the sender. The DIV can later be submitted to the timestamping service to obtain verification that the document was received at the indicated time. In addition, the invention allows for various other forms of document transmission, document identification, and timestamp verification. Senders of facsimile and telecopier transmissions are provided with confirmation that their transmissions were received successfully.

U.S. Pat. No. 7,054,039 to Burke ("Fax Confirmation Device") describes a method and apparatus for placing an indelible mark on each page of a document which has been sent by Fax. The sender's Fax machine applies a clear/transparent chemical or ink message on the surface of the document which contains information such as the Fax machine identification number, telephone number of the FAX recipient, and the time and date of the Fax transmission. The information is printed and is invisible to the naked eye, but becomes visible underneath a low voltage UV light. The light is placed above the tray in which completed faxes are temporarily stored to make the mark visible to the operator to assure that each page of the document was separately sent. A separate pen light allows a sender or management person to confirm that a document has been properly and completely transmitted. The disclosed embodiments provide examples of improved solutions to the problems noted in the above Background discussion and the art cited therein. There is shown in these examples an improved method for providing a secure fax confirmation page from a facsimile capable device having a user interface. The method includes receiving documents, in the form of a fax job, to be transmitted by the facsimile capable device. After receipt of a recipient's fax number, a determination is made as to whether secure fax confirmation has been selected from the user interface. A passcode is received prior to scanning of the documents. The interface displays a fax job list, which identifies whether a secure fax confirmation page is associated with individual fax jobs. Upon selection of a confirmation page by the operator, the facsimile capable device prints a secure fax confirmation page.

In an alternate embodiment there is disclosed a system for providing a secure fax confirmation page from a facsimile capable device having a user interface which presents the services available from the facsimile capable device. The system includes means for receiving documents (a fax job) to be transmitted by the facsimile capable device. The graphical user interface accepts a recipient's fax number, which may be in the form of a telephone number associated with the remote destination to which the fax job is to be sent, an email address, or an electronic address. The system determines whether secure fax confirmation has been selected by the operator and requests a passcode prior to scanning of the documents. A fax job list, which identifies whether a secure fax confirmation page is associated with individual fax jobs is presented. After a confirmation page selection has been made, the secure fax confirmation page is printed.

In yet another embodiment there is disclosed a computer-readable storage medium having computer readable program code embodied in the medium which, when the program code is executed by a computer, causes the computer to perform method steps for providing a secure fax confirmation page from a facsimile capable device having a user interface which presents the services available from the facsimile capable device. The method includes receiving documents, in the form of a fax job, to be transmitted by the facsimile capable device. After receipt of a recipient's fax number, a determination is made as to whether secure fax confirmation has been selected from the user interface. The recipient's fax number may be in the form of a telephone number associated with the remote destination to which the fax job is to be sent, an email address, or an electronic address. A passcode is received prior to scanning of the documents. The interface displays a fax job list, which identifies whether a secure fax confirmation page is associated with individual fax jobs. Upon selection of a confirmation page by the operator, the facsimile capable device prints a secure fax confirmation page.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

For the purposes herein, a "fax" or "facsimile" may be defined as an arrangement by which data relating to an image is sent through an electronic system, such as wire telephone, cell-phone system, or combination of aspects thereof, also generally usable for transmission of data relating to sound.

The secure facsimile confirmation method and system described herein in various embodiments provides a new facsimile security feature that permits a user to instruct a facsimile capable device to store the confirmation page associated with a facsimile communication until the user releases it with a passcode. A button is provided on the user interface of the facsimile device that generates a dialog permitting the user to choose to use the function for securely printing a facsimile confirmation page. This functionality may be included as part of the internal programming of facsimile capable devices and is presented at the user interface of the facsimile device.

While for the purposes of explanation the method and system will be described as functioning within a network including various printing and communication devices, it will be appreciated by those skilled in the art that the secure facsimile confirmation functionality may be beneficially utilized in any communication environment which requires a secure hard copy of a facsimile confirmation. All such variations and modifications are fully contemplated by the scope of the specification and claims herein.

Various computing environments may incorporate capabilities for supporting document communication capabilities utilizing facsimile controllers and equipment on which the facsimile controller may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Figure 1:
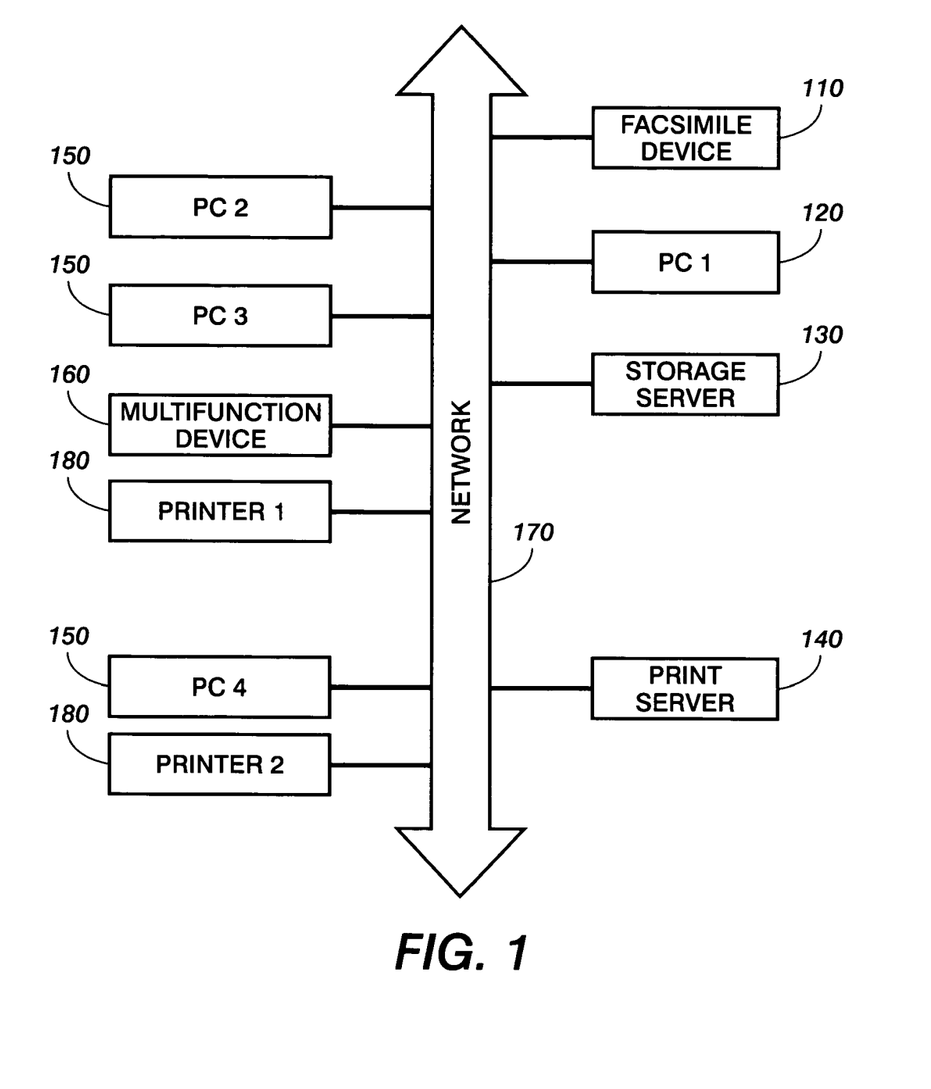
FIG. 1 is a block diagram of one embodiment of a system that provides a secure fax confirmation page.

Referring to FIG. 1, the block diagram illustrates an example embodiment of a system that utilizes facsimile communication in a networked environment. The network environment may contain personal computers (120 and 150) through which users can access printers 180, multifunction device 160 and facsimile device 110. Some or all of the printers may be managed by a print server 140. While for the purposes of brevity of description the method and system are described as utilizing a graphical user interface present on the facsimile device 110 and/or the multifunction device 160 to access the secure facsimile confirmation capability of these devices, such access may be accomplished by any known means, for example through the personal computers residing on the network, through a workstation dedicated to the printer, from a personal digital assistant (pda), smartphone, personal desktop via a remote user interface, or via an Internet print submission, all of which are encompassed by the specification and scope of the claims herein.

The storage server 130 is a shared/private document repository. It also provides storage for the print server, containing, for example, historical printing information, logs, etc. for the printers controlled by the print server. All these main components are coupled together via network 170. The system and method herein are not limited to a particular type of network system 170. Typical network interfaces include general-purpose systems such as POTS (plain-old telephone systems) and ISDN (Integrated Services Digital Network), as well as special-purpose systems such as a LAN (Local Area Network) or a WAN (Wide Area Network). Such networking environments are commonplace in offices, enterprise-wide computer networks, intranets and the Internet. Those skilled in the art will appreciate that the principles of the system and method described herein can be applied to virtually any network system without departing from the scope of the claims and specification.

The personal computers 120 and 150 typically have a processor, random-access memory, read-only memory, and one or more storage devices, such as a hard drive, CD-ROM, DVD, diskette, etc. The processor is coupled to an output device, such as a display device, input devices, such as a keyboard, mouse, or pointer, and communication circuitry. The output device, for example, a monitor, displays information for viewing by a user of personal computer 120 or 150 and an input device is used to control a screen pointer provided by the graphical user interface of the operating system. The system and method herein are not limited to any particular output or input device, including telephone and voice mail technology.

Multifunction device 160 may be any device capable of scanning image material. The scanned image may be in various formats, for example, PDF (portable document format), TIFF (tag image file format), JPEG (joint photographics experts group format), GIF (graphics interchange format), or BMP (BitMaP). In addition to scanning and transmitting the scanned image via electronic mail, multifunction device 160 may also include functionality for printing, copying, or transmitting facsimile images. Operation of multifunction device 160 is controlled from a user interface, which enables a user to select the function to be performed as well as enter information required by the device to perform an operation. Typically buttons or a keypad are utilized to enter information and select functionality, but a touch screen or any other means known in the art may be utilized. Multifunction device 160 communicates with print server 140 as well as storage server 130 and personal computers 110 and 150. The facsimile capability of the user interface also directs the user through the steps necessary to identify the recipient facsimile or multifunction device and to provide the capability to print out a confirmation page.

Facsimile device 110 may be any device that has the capability to print as a printer and scan a document into digital format and transmit the data in analog or digital format (including the raw scanned data or compressed data) to a remote location, such as by an analog (e.g., telephone line) or digital (e.g., the Internet) communication system. In the context of a typical fax machine, only the confirmation page is printed, but this still qualifies as a print capability. However, the embodiments disclosed herein may be practiced in other systems with both fax and print capabilities, such as multifunction devices.

The particular methods performed by the facsimile controller comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 2:
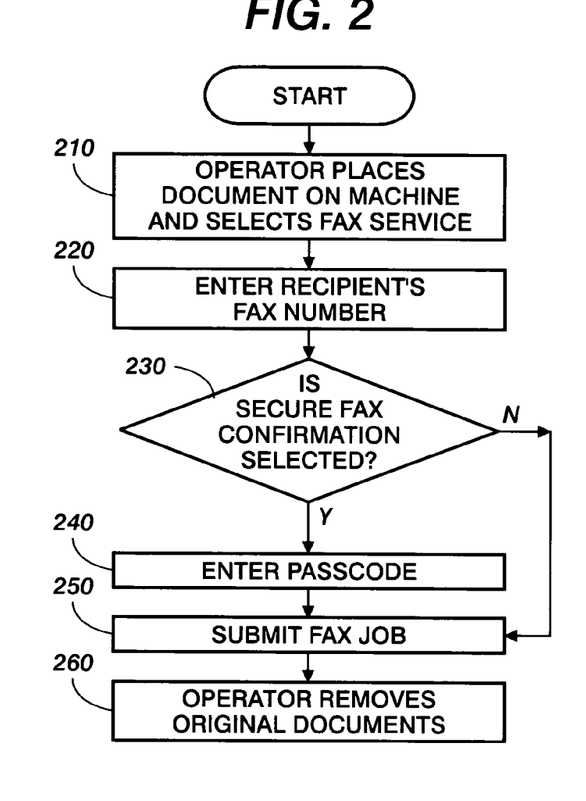
FIG. 2 is a flow diagram that illustrates an embodiment of the send operation for the method for providing a secure fax confirmation page.

Turning to FIG. 2, there is shown operation of one example embodiment of the method for selecting secure fax confirmation capability in a facsimile capable device. At 210 an operator places a document(s) on a fax capable printer and selects fax services, which is provided by the user interface of the fax capable printing device. The user interface may include, but is not limited to, a display, a graphical user interface provided on a display, a keypad, and/or input buttons. At 220 the recipient's fax number is entered. The term "fax number" will typically be a telephone number associated with the remote destination (e.g., a fax receiving machine), to which the fax is to be sent, but also includes an email or other type of electronic address. At 230 a determination is made as to whether the secure fax confirmation capability has been selected. If secure fax has been selected, the operator is prompted for a secure print passcode and may optionally be asked to confirm the secure print passcode. The operator enters the secure print passcode at 240. The operator may then submit the fax job at 250 by utilizing any of various options known in the art, such as hard or soft buttons, a keypad, or a graphical user interface. After the fax has been processed, the operator removes the original documents from the fax capable device at 260.

In an alternate embodiment, a passcode may be previously set up on an operator's personal device and would be fetched rather than entered at the time that secure fax confirmation is selected, or at the time the fax confirmation page is released. In this embodiment, the operator selects "secure fax confirmation" without entering a passcode. For example, a password may be required to login to a personal device such as a smartphone. That same password may be used as a "universal" password for a variety of devices and accounts including faxing. The operator accesses the faxing capability after logging in on the personal device with the password and selects a "release" button, which would send the personal device password to the fax device to release the confirmation page. The personal device provides this capability through a user interaction dialog that permits the user to press a single button to send the user's password(s) to different devices without entering all the characters of the password. The operator may then select an operation to instruct release of the fax confirmation page to transmit an instruction to print the confirmation page.

Alternatively, the user could send the passcode using device selection buttons appearing on the personal device dialog. More generally, any device that "knows the user" either through information conveyed via a previous login, biometric identification, magnetic stripes, bar codes, bluetooth protocols or other methods would require only a single button press to send a passcode. Thus, the passcode transaction could be via a graphical user interface, a hardware interface, or through ubiquitous computing methods in which the user "broadcasts" his or her identify via a wireless method.

Figure 3:
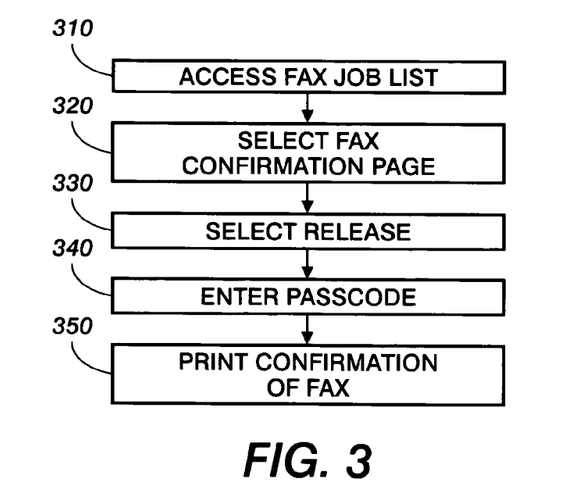
FIG. 3 is a flow diagram that illustrates an embodiment of the print operation for the method for providing a secure fax confirmation page.

Referring now to FIG. 3, an example embodiment of print operation for the method for providing a secure fax confirmation page is illustrated. At 310 an operator accesses the list of fax jobs which have been processed or waiting to be processed. This may be provided by various known means, such as selecting a Job Status button or using other means to navigate to an information pane containing the list of fax jobs. The list of jobs includes an indicator as to whether a proposed "Secure Fax Confirmation" page is associated with specific fax job(s). The operator selects the fax job name corresponding to the secure fax confirmation page at 320. The operator then decides whether to proceed with printing of the secure fax confirmation page. To print the secure fax confirmation page, the operator selects release at 330. The operator is then prompted by a user interface display screen to provide a passcode, which the operator enters at 340. The operator then instructs the device to print the secure fax confirmation page at 350.

Figure 4:
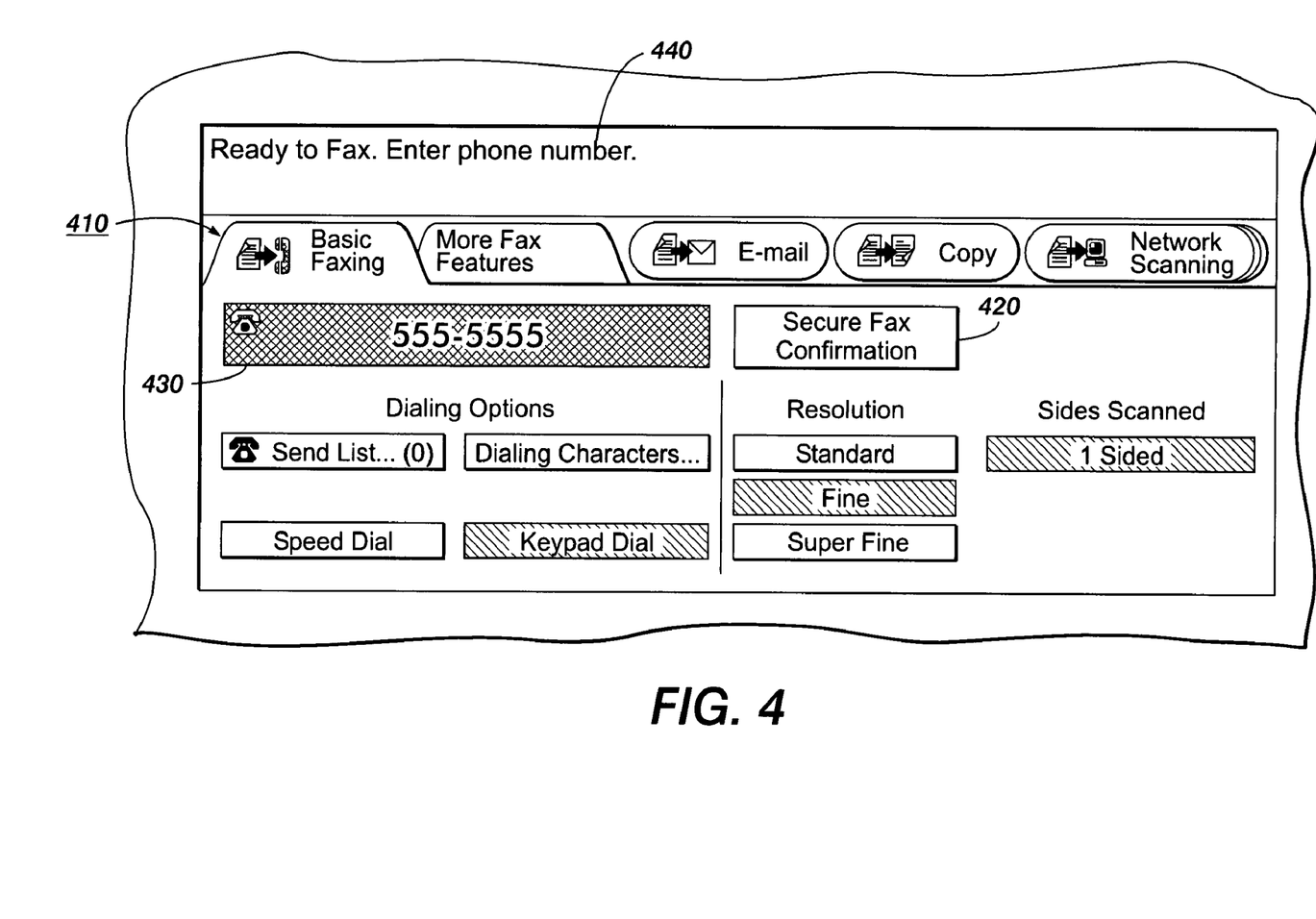
FIG. 4 is an example embodiment of a dynamic graphic display for presenting the secure fax confirmation page capability.
Figure 5:
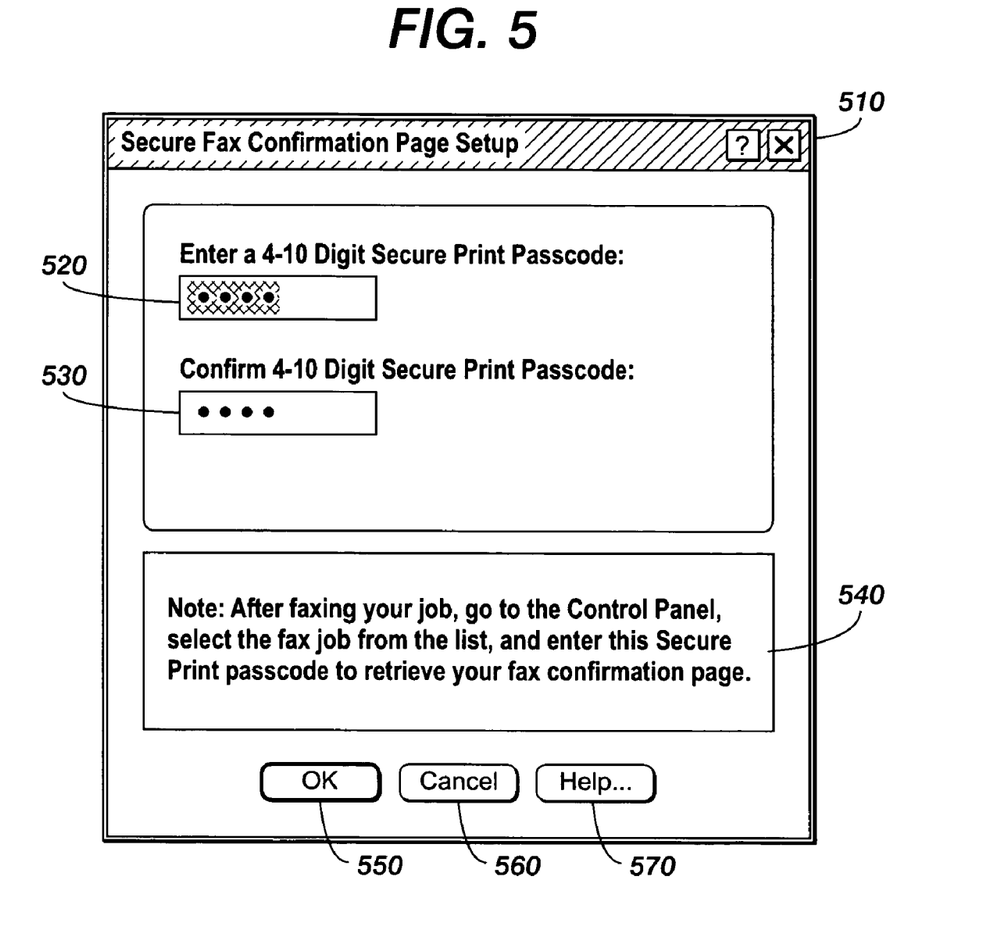
FIG. 5 is an example embodiment of a dynamic graphic display for requesting a secure fax password.

Turning to FIGS. 4 and 5, there is shown operation of one embodiment of the method for selection of the secure fax confirmation capability in a facsimile capable device utilizing a graphical user interface. While for the purposes of this embodiment a graphical user interface is illustrated, those skilled in the art will appreciate that the functionality described could be employed utilizing various alternate technologies known in the art, such as hard or soft input buttons, keyboard, PC display, etc. All such variations known or to be discovered in the art are fully contemplated by the specification and scope of the claims herein. Referring now to FIG. 4, after an operator places a document(s) on a fax capable printer a graphical user interface presents a display 410 including the capability available on the printing device. The operator selects the fax services tab 440 and may prompt the operator for the intended recipient's fax number at 430. The term "fax number" will typically be a telephone number associated with the remote destination (e.g., a fax receiving machine), to which the fax is to be sent, but also includes an email or other type of electronic address. User interface screen 410 also provides the option for selection of the secure fax confirmation capability as a soft button at 420 in this embodiment.

Referring now to FIG. 5, selection of the secure fax confirmation capability accesses the secure fax confirmation page setup screen 510. Secure fax confirmation page 510 prompts the operator for a secure print passcode at 520 and a confirmation of the secure print passcode at 530. The operator may then confirm the setup of secure fax confirmation by selecting button 550 from the secure fax confirmation screen 510. Optionally, a message 540 may be presented, as shown in the example format, providing instructions on obtaining a printed secure fax confirmation page. After the fax has been processed the operator removes the original documents from the fax capable device. Alternatively, the operator may depress the cancel button 560 to cancel the secure confirmation. The operator then presses "Start", "Send" or similar type of command button to send the fax. Thus, the secure fax confirmation capability is an additional step in the typical fax process of 1. load a document, 2. enter a destination, and 3. send the fax. The selection of secure fax confirmation may appear between the steps of entering a destination and sending the fax, as illustrated in this embodiment, but is not required to be in that sequence. For example, the selection of secure fax confirmation could occur after the command to send the fax is entered. In this example embodiment, the operator would be queried whether secure confirmation is required. Soft button 570 assists the operator in obtaining assistance in utilizing the secure fax confirmation capability.

Optionally, it would be convenient for the operator to be notified by the device, via email for example, that a confirmation page was waiting to be printed. This may be accomplished through an online registration and setup procedure prior to the operator approaching the machine, or the operator could use the email functionality of the multifunction machine to instruct it to send an email when a confirmation page is waiting to be released. All means of accomplishing notification of the operator known or to be discovered in the art are fully contemplated by the specification and scope of the claims herein.

Figure 6:
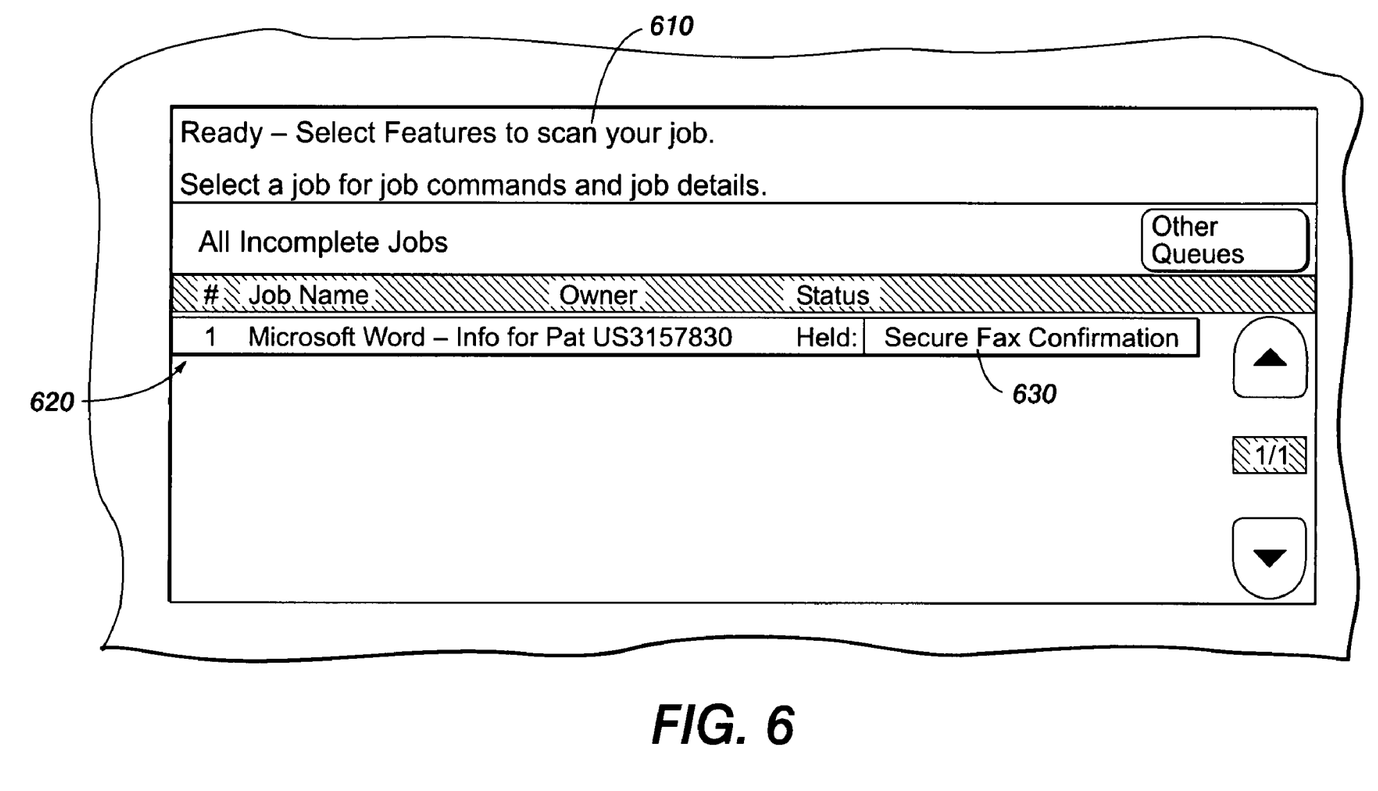
FIG. 6 is an example embodiment of a dynamic graphic display for accessing the job status record for a fax job.
Figure 7:
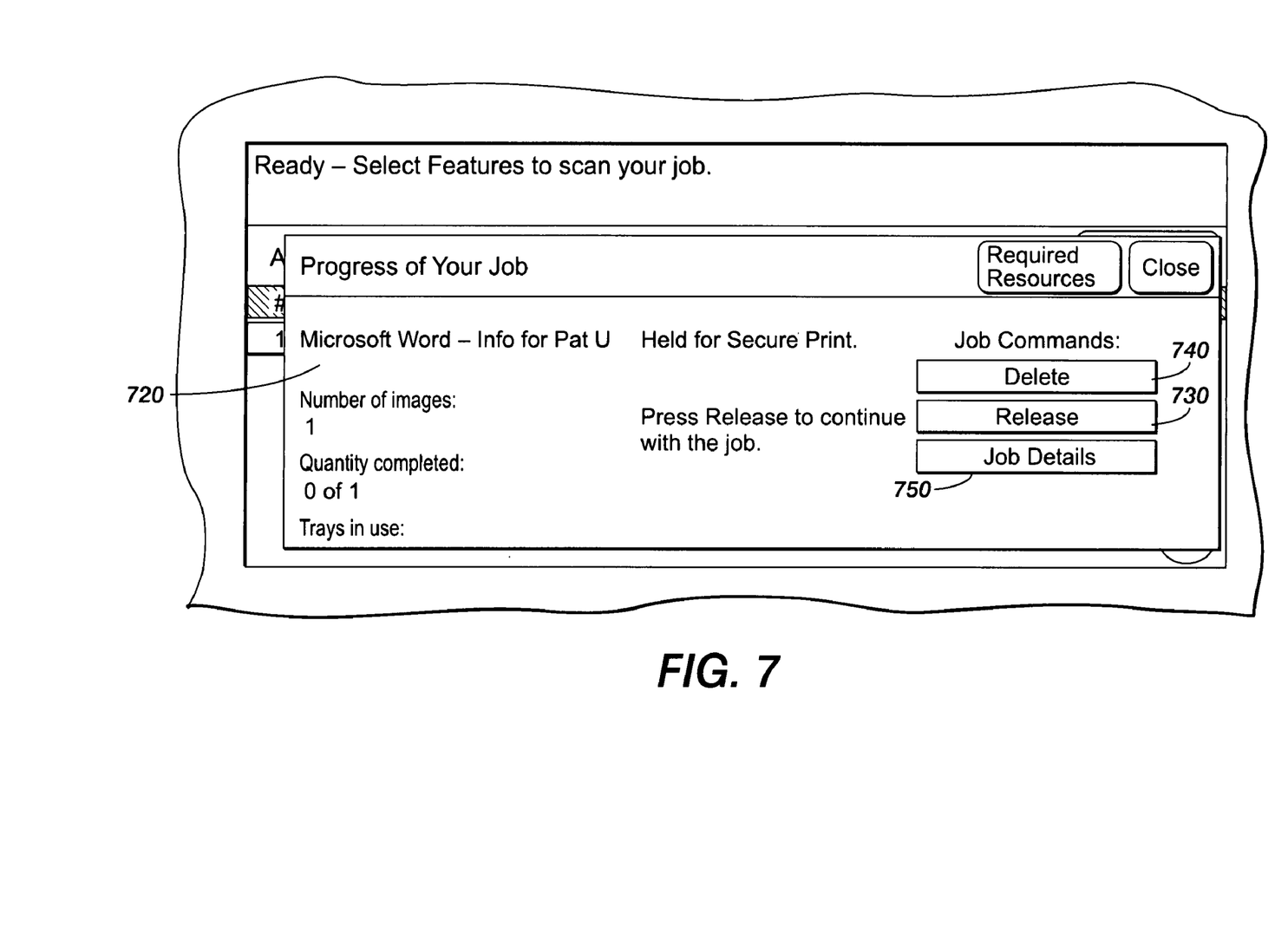
FIG. 7 is an example embodiment of a dynamic graphic display for presenting the job status of a secure print fax job.
Figure 8:
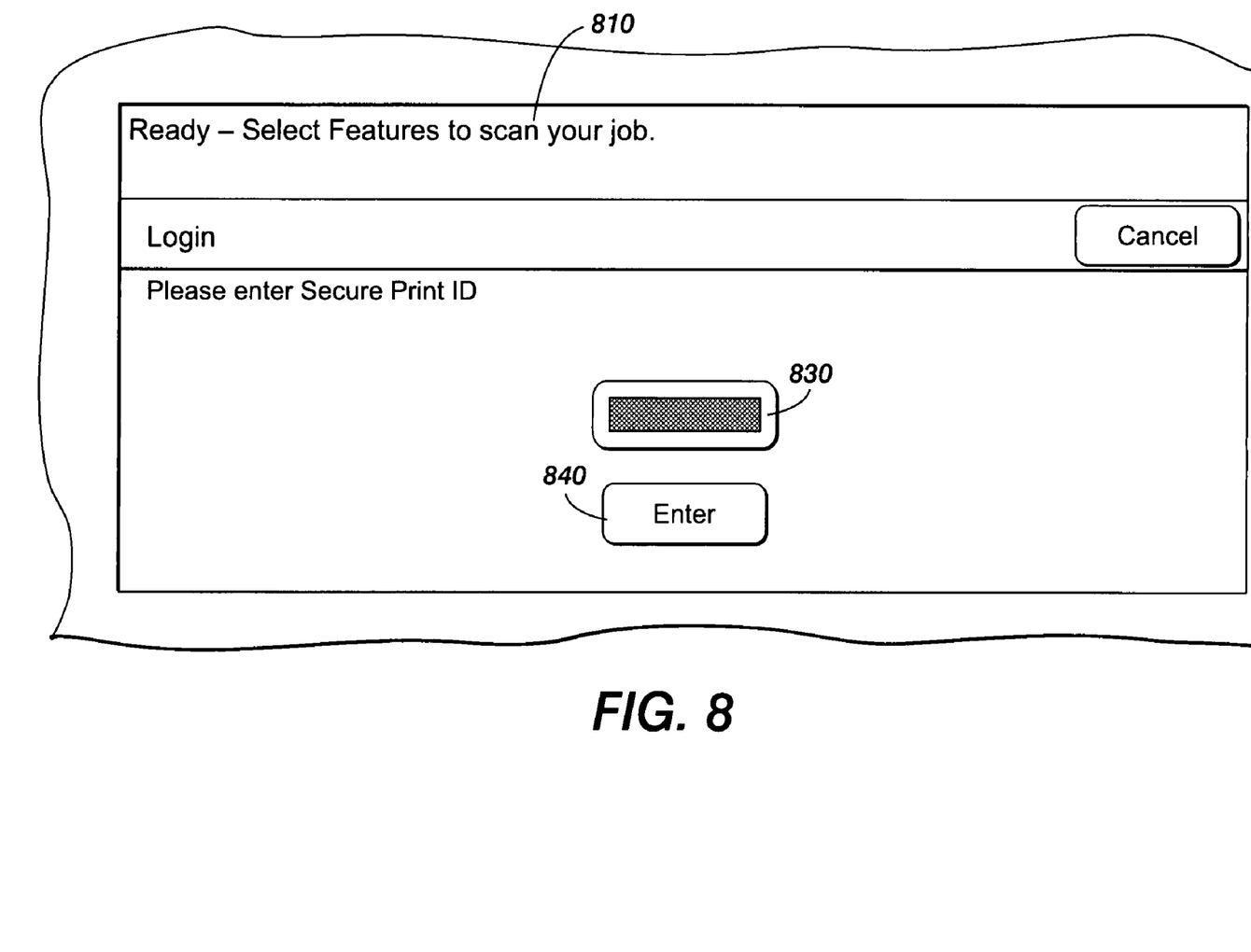
FIG. 8 is an example embodiment of a dynamic graphic display for entering a passcode to enable printing of a secure fax confirmation sheet.

Turning now to FIGS. 6-8, there is shown operation of one embodiment of the method for printing of the secure fax confirmation page from a facsimile capable device utilizing a graphical user interface. While for the purposes of this embodiment a graphical user interface is illustrated, those skilled in the art will appreciate that the functionality described could be employed utilizing various alternate technologies known in the art, such as hard or soft input buttons, keyboard, PC display, etc. All such variations known or to be discovered in the art are fully contemplated by the specification and scope of the claims herein. An operator accesses the list of fax jobs which have been processed or waiting to be processed by any known means. This may be provided by selection of a job status screen from the display of a user interface 610. In this example embodiment, the list of jobs 620 includes one job displaying a proposed "Secure Fax Confirmation" page waiting to be released to print (630). The operator selects the fax job name corresponding to the secure fax confirmation page.

Turning now to FIGS. 7 and 8, when the fax job name corresponding to the secure fax confirmation is selected, a dialog 720 to release jobs held for secure print appears. From this dialog box, the operator may choose to delete the secure fax confirmation page at 740, or to obtain job details at 750. To print the secure fax confirmation page, the operator selects the release soft button 730. Referring now to FIG. 8, dialog screen 810 prompts the operator to provide a passcode at 830. After the operator enters the passcode, depressing the soft button 'enter' 840 provides a signal that instructs the device to print the secure fax confirmation page.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for providing a secure fax confirmation page from a facsimile capable device, wherein said facsimile capable device includes a user interface which presents the services available from the facsimile capable device, the method comprising:

receiving documents to be transmitted by said facsimile capable device, wherein said documents to be transmitted comprise a fax job;

receiving a recipient's fax number, wherein said fax number comprises at least one member selected from the group comprising a telephone number associated with the remote destination to which said fax job is to be sent, an email address, and an electronic address;

determining whether secure fax confirmation has been selected;

receiving a passcode unique to an operator;

scanning and transmitting said fax job;

storing a secure fax confirmation page associated with said fax job;

providing a fax job list, wherein said fax job list identifies whether a secure fax confirmation page is associated with individual fax jobs;

allowing selection by said operator of at least one of said fax jobs having a secure fax confirmation page; and printing said secure fax confirmation page associated with said selected fax job upon receipt of said passcode.

2. The method for providing a secure fax confirmation page according to claim 1, wherein said user interface includes at least one member selected from the group comprising a display, a keypad, and input buttons.

3. The method for providing a secure fax confirmation page according to claim 1, wherein said passcode may be supplied directly to said facsimile capable device by said operator or may be supplied by the operator from a personalized device.

4. The method for providing a secure fax confirmation page according to claim 3, further comprising:

prompting said operator to provide a passcode after a confirmation page selection is received when said operator is providing instructions on the said facsimile capable device; and transmitting instructions to said facsimile capable device to print said secure confirmation page.

5. The method for providing a secure fax confirmation page according to claim 3, wherein said passcode is provided from a personalized device that recognizes said operator through information conveyed via a previous login, biometric identification, magnetic stripes, bar codes, Bluetooth protocols or other methods requiring a single button press to send said passcode.

6. The method for providing a secure fax confirmation page according to claim 5, wherein said passcode is transmitted via a graphical user interface, a hardware interface, or through ubiquitous computing methods to the facsimile device.

7. The method for providing a secure fax confirmation page according to claim 5, further comprising accessing said fax job list from said personalized device and selecting a secure fax confirmation page.

8. The method for providing a secure fax confirmation page according to claim 7, further comprising transmitting instructions to said facsimile device from said personalized device to print said secure fax confirmation page.

9. The method for providing a secure fax confirmation page according to claim 3, further comprising prompting said operator for said passcode if secure fax confirmation has been selected and said operator is providing instructions on said facsimile capable device.

10. The method for providing a secure fax confirmation page according to claim 9, further comprising requesting confirmation of said passcode.

11. The method for providing a secure fax confirmation page according to claim 1, further comprising transmitting instructions to process said fax job by utilizing at least one member selected from the group comprising hard buttons, soft buttons, a keypad, a personal computer display, and a graphical user interface.

12. The method for providing a secure fax confirmation page according to claim 1, further comprising presenting a message on the user interface, wherein said message provides instruction for obtaining said printed secure fax confirmation page.

13. The method for providing a secure fax confirmation page according to claim 1, further comprising notifying said operator by electronic message means that a confirmation page was waiting to be printed.

14. A system for providing a secure fax confirmation page from a facsimile capable device, wherein said facsimile capable device includes a user interface which presents the services available from the facsimile capable device, the system comprising:

means for transmitting documents as a facsimile, wherein said documents to be transmitted comprise a fax job;

means for inputting a recipient's fax number, wherein said fax number comprises at least one member selected from the group comprising a telephone number associated with the remote destination to which said fax job is to be sent, an email address, and an electronic address;

means for determining whether secure fax confirmation has been selected for said fax job;

means for storing a secure fax confirmation page associated with said fax job;

means for receiving a passcode unique to an operator;

means for scanning and transmitting said fax job;

means for storing a secure fax confirmation page associated with said fax job;

means for providing a fax job list, wherein said fax job list identifies whether a secure fax confirmation page is associated with individual fax jobs;

means for allowing selection by said operator of at least one of said fax jobs on said fax job list having a secure fax confirmation page;

means for supplying a passcode specific to said operator; and means for printing said secure fax confirmation page upon receipt of said passcode.

15. The system for providing a secure fax confirmation page according to claim 14, wherein said passcode may be provided directly to said facsimile capable device by said operator or may be supplied by said operator from a personalized device.

16. The system for providing a secure fax confirmation page according to claim 14, further comprising prompting said operator for said passcode if secure fax confirmation has been selected and said operator is providing instructions on the facsimile capable device, 17. The system for providing a secure fax confirmation page according to claim 14, further comprising:

prompting said operator to provide a passcode after a confirmation page selection is received when the operator is providing instructions on said facsimile capable device; and transmitting instructions to said facsimile capable device to print said secure confirmation page.

18. The system for providing a secure fax confirmation page according to claim 14, wherein said passcode is provided from a personalized device that recognizes said operator through information conveyed via a previous login, biometric identification, magnetic stripes, bar codes, Bluetooth protocols or other methods requiring a single button press to send said passcode.

19. The system for providing a secure fax confirmation page according to claim 18, further comprising accessing said fax job list from said personalized device and selecting a secure fax confirmation page.

20. A computer-readable storage medium having computer readable program code embodied in said medium which, when said program code is executed by a computer causes said computer to perform method steps for providing a secure fax confirmation page from a facsimile capable device, wherein said facsimile capable device includes a user interface which presents the services available from the facsimile capable device, the method comprising:

receiving documents to be transmitted by said facsimile capable device, wherein said documents to be transmitted comprise a fax job;

receiving a recipient's fax number, wherein said fax number comprises at least one member selected from the group comprising a telephone number associated with the remote destination to which said fax job is to be sent, an email address, and an electronic address;

determining whether secure fax confirmation has been selected;

receiving a passcode unique to an operator;

scanning and transmitting said fax job;

storing a secure fax confirmation page associated with said fax job;

providing a fax job list, wherein said fax job list identifies whether a secure fax confirmation page is associated with individual fax jobs;

allowing selection b said operator of at least one of said fax jobs having a secure fax confirmation page; and printing said secure fax confirmation page associated with said selected fax job upon receipt of said passcode.

* * * * *